Figure 1:
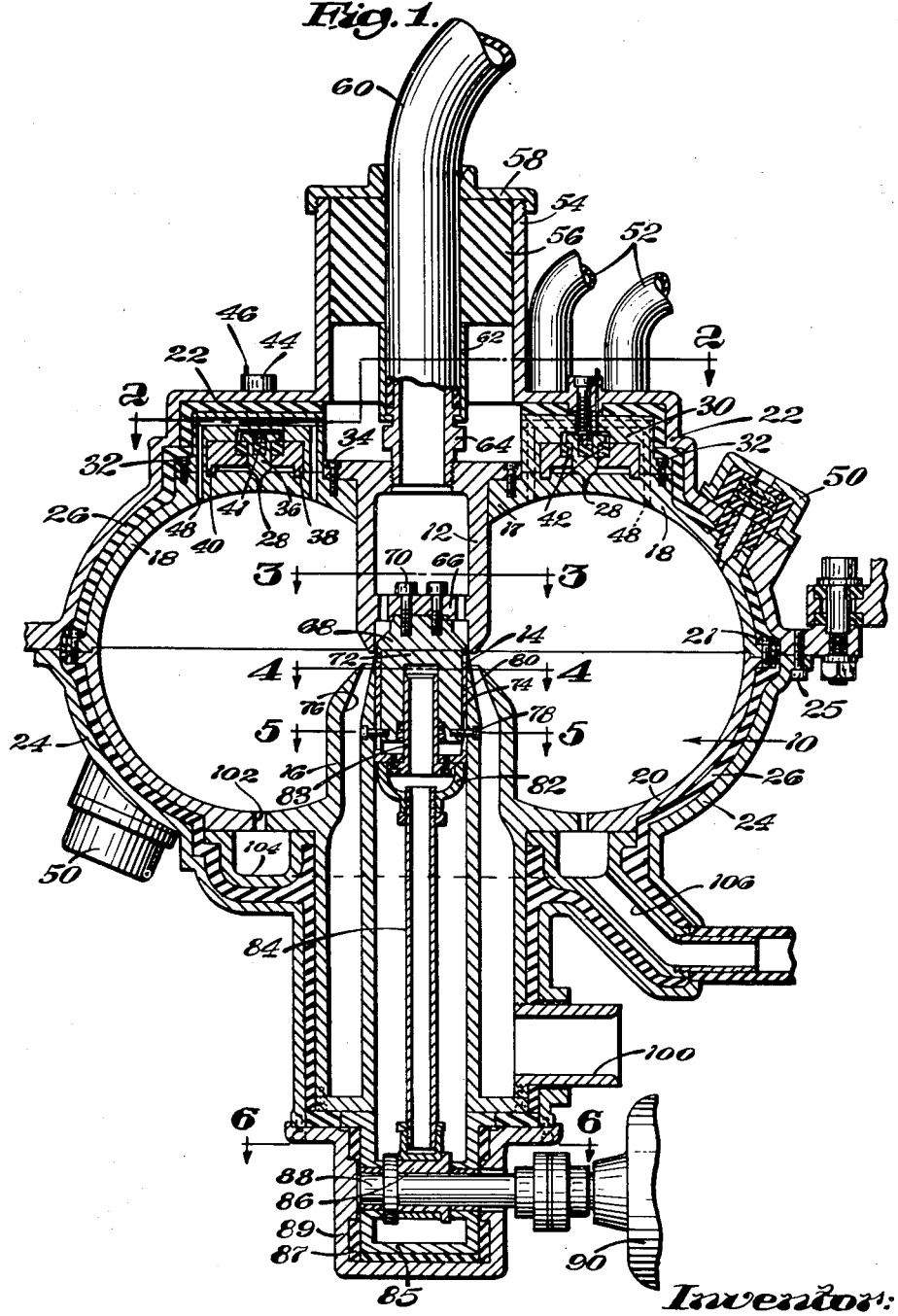

Nov. 28, 1950

C. B. HORSLEY 2,532,229

ACOUSTIC DEVICE

Filed Feb. 21, 1946

5 Sheets-Sheet 1

Inventor:
Caperton B. Horsley,
by Kenway & Witter
Attorneys

Nov. 28, 1950 — C. B. HORSLEY — 2,532,229
ACOUSTIC DEVICE
Filed Feb. 21, 1946 — 5 Sheets-Sheet 2

Inventor:
Caperton B. Horsley,
by Kenway & Witter
Attorneys

Nov. 28, 1950   C. B. HORSLEY   2,532,229
ACOUSTIC DEVICE

Filed Feb. 21, 1946   5 Sheets—Sheet 3

Inventor:
Caperton B. Horsley
by Munway & Witter
Attorneys

Nov. 28, 1950  C. B. HORSLEY  2,532,229
ACOUSTIC DEVICE
Filed Feb. 21, 1946  5 Sheets-Sheet 4

Inventor:
Coperton B. Horsley
by Kenney & Witter
Attorneys

Nov. 28, 1950 — C. B. HORSLEY — 2,532,229
ACOUSTIC DEVICE
Filed Feb. 21, 1946 — 5 Sheets—Sheet 5

INVENTOR.
Caperton B. Horsley
BY Kenway & Witter
Attys.

Patented Nov. 28, 1950

2,532,229

UNITED STATES PATENT OFFICE 2,532,229

ACOUSTIC DEVICE

Caperton B. Horsley, Stamford, Conn., assignor to Ultrasonic Corporation, Boston, Mass., a corporation of Massachusetts Application February 21, 1946, Serial No. 649,279

3 Claims. (Cl. 116—137)

My invention relates to apparatus useful in various processes for treating materials with compression waves. In one aspect my invention consists in an improved generator for sound or compression waves, while, in another aspect, my invention pertains to a novel combination of a compression wave generator and frequency modulating means with a treating chamber into which the compression waves are directed and through which various materials may be passed for treatment.

The general background for the present invention is discussed in considerable detail in my copending applications Ser. No. 624,504 filed October 25, 1945, now abandoned; Ser. No. 645,224, filed February 2, 1946, now Patent Number 2,456,706; and Ser. No. 646,178, filed February 7, 1946, now Patent Number 2,448,372. Accordingly, reference is made to the said copending applications for a fuller treatment of the general subject than will be found herein. In a sense the present invention consists in certain modifications and improvements upon the apparatus disclosed in my copending applications.

Before proceeding further I believe it desirable to define the term "compression waves." Briefly speaking, compression waves are any series of alternately positive and negative pressure regions travelling through a medium. The term includes audible as well as ultrasonic frequencies, and a device useful for generating and utilizing compression waves may for convenience sake be referred to as "an acoustic device," although such apparatus is by no means limited to use with waves of audible frequency.

The most important object of my present invention is to increase the efficiency with which compression waves may be generated, modulated, and directed against a material to be treated.

Another object of my invention is to provide a relatively light, compact, and easily assembled unitary device within which compression waves are generated, modulated, and utilized for the treatment of various materials.

An important feature of my invention resides in a treating chamber provided internally with means for generating compression waves in a gaseous medium together with means for modulating the frequency of compression waves so generated.

Figure 2:
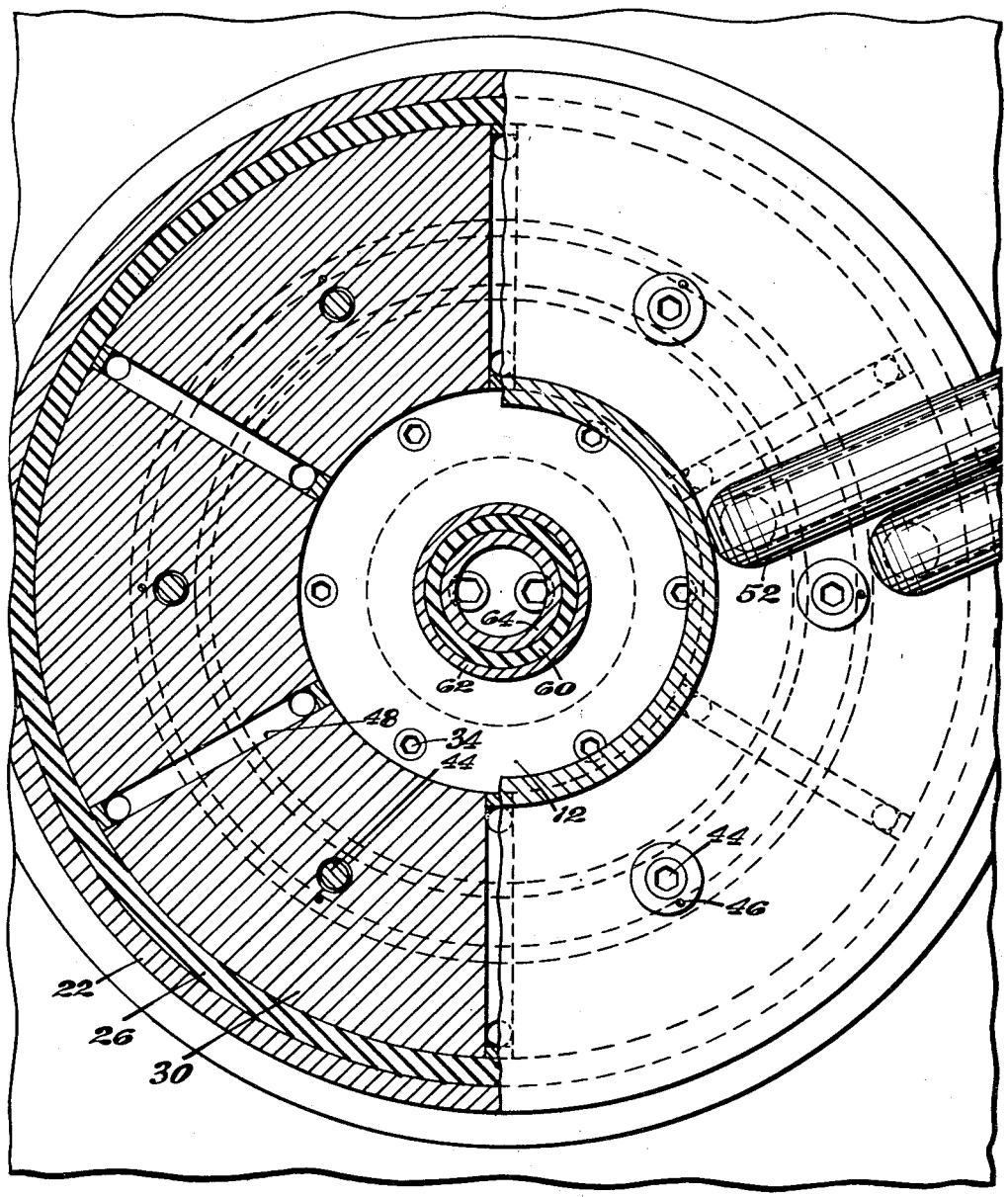
Figure 3:
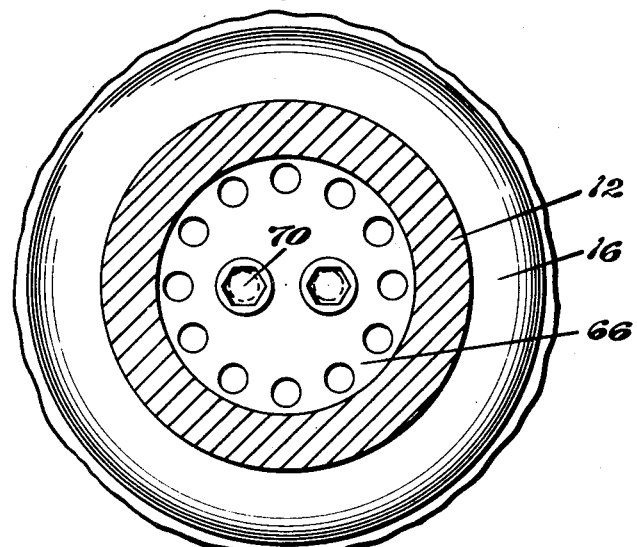
Figure 4:
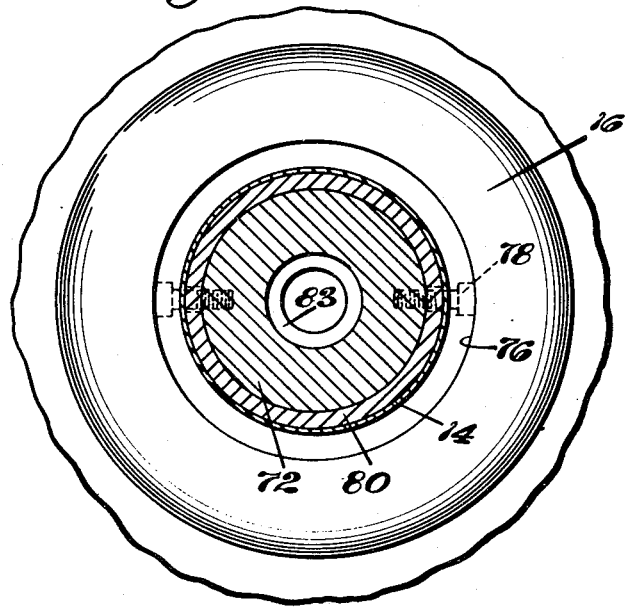
Figure 5:
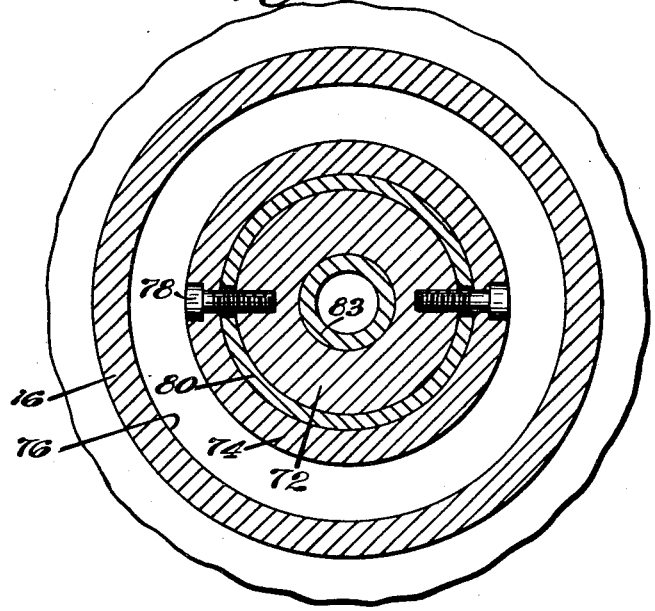
Figure 6:
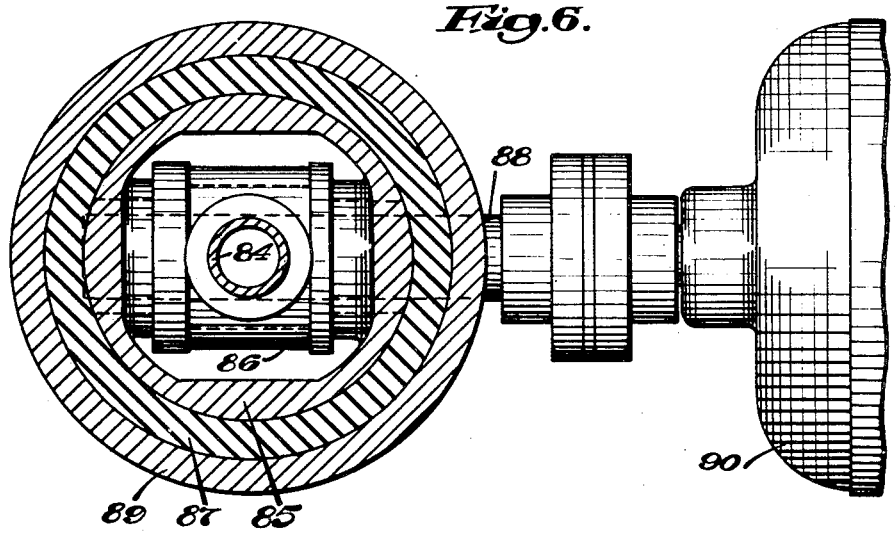
Figure 7:
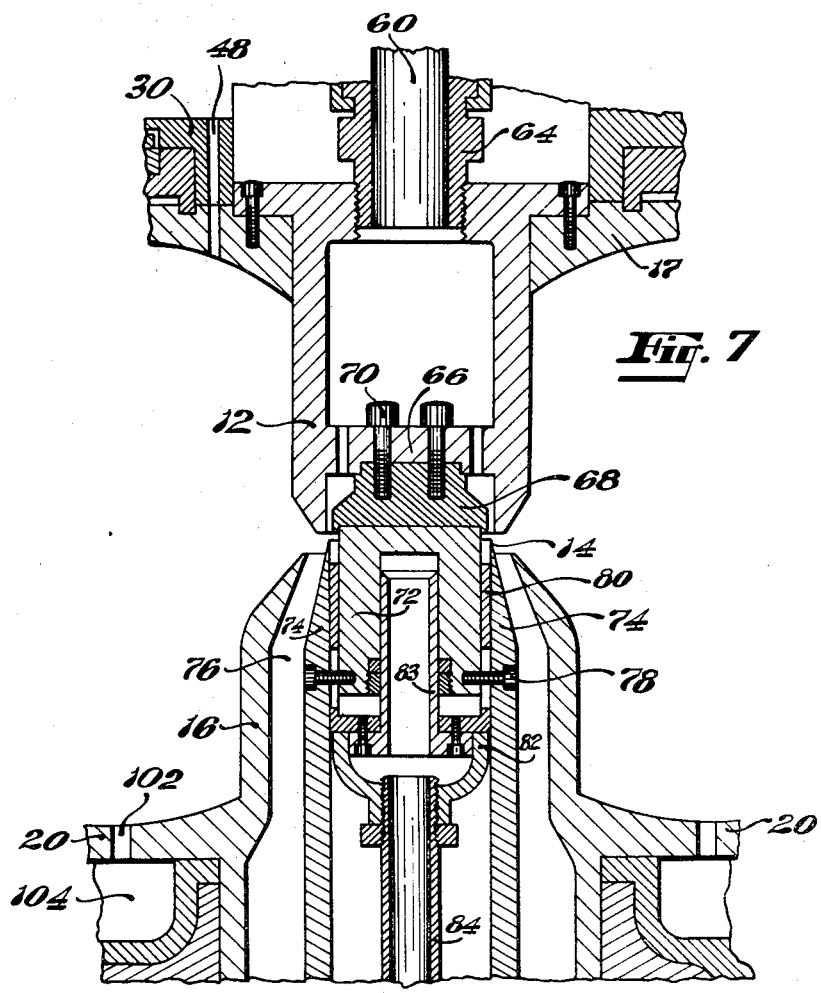
Figure 8:
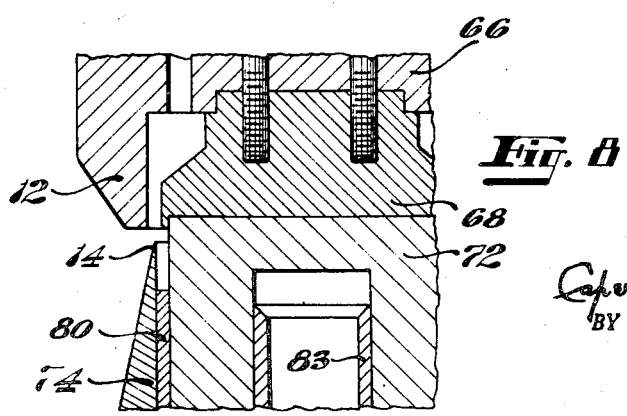

These and other objects and features of the invention will be more readily understood and appreciated from the following detailed description of a preferred embodiment thereof selected for purposes of illustration and shown in the accompanying drawings, in which:

Fig. 1 is a view in vertical cross section through a device embodying my invention, Fig. 2 is a view in cross section along the line 2—2 of Fig. 1, Fig. 3 is a view in cross section along the line 3—3 of Fig. 1, Fig. 4 is a view in cross section along the line 4—4 of Fig. 1, Fig. 5 is a view in cross section along the line 5—5 of Fig. 1, Fig. 6 is a view in cross section along the lines 6—6 of Fig. 1, Fig. 7 is a view in vertical cross section showing an enlarged view of the central portion of Fig. 1, and Fig. 8 is a view in vertical cross section, showing the central portion of Fig. 7 enlarged and in detail.

In the embodiment of the invention shown in the drawings the several elements are organized about a toroidal chamber 10 in the major axis of which a nozzle 12 is disposed. A knife edge tube 14 is disposed in alignment with the outlet from the nozzle 12 and spaced only slightly therefrom; an exhaust pipe or tube 16 surrounds the tube 14 for the purpose of providing an exit for air or gas blown through the nozzle 12 and against the knife edge 14. The interception, by the knife edge 14, of the blast of air leaving the nozzle 12 results in the generation of compression waves which travel out into the body of the toroidal chamber 10. For a discussion of the behavior of compression waves projected into a toroidal chamber I refer to my copending application Serial No. 645,224 filed February 2, 1946.

The toroidal chamber is formed by securing together a series of appropriately curved segmental castings of stainless steel or other suitable material including an upper central annular casting 17, a main upper casting 18, a lower central casting 16 (including the exhaust pipe), and a main lower casting 20. The casting 17 is secured to a flange on the nozzle 12 by means of a series of screws 34, while the main castings 18 and 20 are secured together by means of a series of bolts 21. The castings 16, 17, 18 and 20 are surrounded by a relatively thick layer 26 of sponge rubber, fiber glass, or other suitable sound absorbing material, and the layer 26 is in turn confined by an outer casing including an upper section 22 secured to a lower casing section 24 by means of a number of bolts 25. The purpose of the rubber layer 26 and the outer casing is to prevent the dissemination from the device of noise from the chamber due to compression waves of audible frequency as well as to prevent physiological damage to bystanders by reason of the emission of compression waves at ultrasonic frequencies.

The castings 17 and 18 are so arranged as to leave between them a relatively narrow annular passage or inlet 28 at the top of the chamber 10. Bridging the gap between the two castings and disposed above the outlet 28 is an annular guide bar 30 having in cross section the shape of an inverted U, the outer leg of which is provided with a peripheral shoulder for the reception of a series of screws 32 by means of which the bar 30 is secured to the casting 18. Fitting into the inlet 28 is an annular bevelled edge valve member 36 which is arranged to slide vertically between a pair of annular guide rings 38 and 40. The top of the valve member 36 is flanged and sits upon a pair of rubber rings 42 secured in grooves in the guides 38 and 40. The valve member 36 is also slotted at the top to receive a rubber ring 41 upon which bears a steel ring which in turn is borne upon by a series of screws 44 which extend to the exterior of the device through the casing 22. The construction of the guide rings 38 and 40 is such that there is an annular channel on either side of the bevelled edge valve member 36, which communicates with a pair of conduits 52, through which a liquid or liquids to be treated may be fed into the channels. The access of the liquid in the channels to the inlet 28 is controlled by the position of the screws 44, and a vertical pin 46 having graduations thereon (not shown) is disposed by the side of each of the screws 44 and rests at its lower end upon the top of the valve member 36. By matching the heights of the pins 46, the operator may adjust the valve member 36 so that the opening is of uniform width throughout the extent of the inlet 28.

It is contemplated that liquid introduced into the chamber through the inlet 28 will take the form of a cylindrical curtain flowing through the chamber. In order to protect the curtain from the effect of pressure differentials within the chamber I provide a series of by-pass conduits 48 each of which extends upwardly from the casting 18, through the guide 30, and downwardly again into the chamber 10 through the casting 17. The by-passes 48 serve to maintain equal pressure on both sides of the curtain in the chamber 10. At various points I provide viewing ports 50 through which an observer may watch the interior of the chamber or through which measuring instrumentalities may be introduced into the chamber for determining the extent of various effects being produced during a treating process.

The casing 22 merges into an upwardly extending cylindrical portion 54 disposed above the nozzle 12 and enclosing a thick annular block 56 of sponge rubber. A cap 58 is screwed to the top of the cylindrical portion 54 and apertured to receive a conduit 60 which extends through the sponge rubber block 56, terminates above the nozzle 12, and embraces the upper end of a union 64 screwed into the top of the nozzle. A sleeve 62 surrounds the lower portion of the conduit 60 and has a flange at its lower end held between a pair of shoulders or collars formed integrally with the union 64.

Near its lower end the nozzle 12 is provided with an internal perforated partition or wall 66 through which pass a pair of screws 70 by means of which a cylindrical plug 68 is secured in such position that it nearly fills the end of the nozzle, leaving only a very narrow annular outlet therefrom. The end of the plug 68 is provided with a very shallow central bore which receives the end of a cylindrical plug 72 disposed within a tube 74 which is axially aligned with the nozzle 12 and terminates at its upper end in a sharp knife edge 14 which lies opposite the annular outlet from the nozzle 12. The plug 72 is so dimensioned as to leave a relatively narrow annular space between the knife edge tube 74 and the plug 72; between the knife edge tube 74 and the exhaust tube 16 there is a wider annular exhaust passage 76. A movable sleeve 80 is disposed in the space between the plug 72 and the tube 74 and slotted adjacent its lower end to accommodate a plurality of screws 78 by means of which the plug 72 is held in position with respect to the tube 74. The sleeve 80 is provided at its lower end with a flange screwed to a cup 82 which supports an upwardly extending tube 83 working in a central bore formed in the plug 72. At its lower end the cup 82 is threaded to a long hollow shaft 84 threaded at its lower end into a socket mounted for rotation about an eccentric 86 secured to a shaft 88 driven by an external motor 90. The shaft 88 and the eccentric 86 are disposed in a well or cup 85 surrounded by a layer 87 of sponge rubber and an outer casing 89.

The tube 83 fits snugly within the bore in the plug 72, while the sleeve 80 fits rather loosely in the space between the plug 72 and the tube 74. When the motor 90 is energized, the eccentric 86 causes the shaft 84 to reciprocate vertically and thus to reciprocate the tube 83 and the sleeve 80. It is contemplated that oil or other lubricating fluid can be introduced through the hollow shaft 84, the cup 82 and into the tube 83. Thus lubrication is provided for the sliding of the tube 83 in the bore of the plug 72. The sleeve 80 fits more loosely between the plug 72 and the tube 74 because it is not practical to introduce a lubricating fluid into this portion of the mechanism. To do so would result in fouling up the chamber, because escaping oil would be vaporized and squirted into the interior of the chamber.

An exhaust outlet 100 is provided in the lower portion of the casting 16 and provides means through which air may leave the device. The castings 16 and 20 are so disposed as to leave between them at the bottom of the chamber 10 an annular outlet 102 considerably wider than the inlet 28 and communicating with a sump or drain trough 104 secured to the casting 16 and 20 by means of a series of screws, not shown, and connected to a drain pipe 106.

In operating the device, I connect the conduit 60 to a source of compressed air, or other gas, which emerges from the nozzle 12 as an annular blast and is intercepted almost immediately by the knife edge 14. The air then travels through the exhaust passage 76 and out of the apparatus through the outlet 100. By disposing the tube 74 in proper relation to the casting 16, as shown in Fig. 1, substantially all of the air leaving the nozzle 12 will pass into the exhaust passage 76. Care must be taken to insure the proper relative disposition of the elements of the mechanism, since otherwise the air blasts would pass into the chamber 10 and there disrupt the curtain and cause chaotic turbulence which would seriously interfere with the treating process being carried out.

It will be observed that there is provided between the knife edge tube 74 and the plug 72 a narrow annular chamber bottomed by the top of the reciprocating sleeve 80. This chamber is somewhat analagous to the resonating chamber of a Galton whistle, but the annular chamber shown in the drawing permits greater amplitudes at high frequencies than would be possible with a conventional cylindrical chamber of a Galton whistle. The effect of the stream of air against the circular knife edge 14 is to set into vibration the air contained in the chamber. The frequency at which this air vibrates is a function of the depth of the annular chamber, and it will be seen that this depth is constantly changed as the result of the reciprocation of the sleeve 80. Roughly speaking, the frequency will decrease as the depth of the chamber is increased. The resonating chamber in a Galton whistle is cylindrical and if high frequencies are to be generated, the required volume is so small that it can only be obtained, in the conventional Galton whistle, by building a whistle in which the diameter of the nozzle and knife edge is exceedingly small. Consequently it is impossible to produce in a Galton whistle high frequency compression waves which have energies high enough to perform useful work. However, by employing an annular chamber, formed between the plug 72 and the tube 74, I form what amounts to a whole series of Galton whistles disposed in circular formation. Consequently I am able to produce waves at very high frequencies without reducing the energy below commercially acceptable values.

There will be, in the operation of the device constructed according to my invention, a given frequency above and below which the reciprocating sleeve will continuously effect a cycle of modulation. For example, the sleeve may be so set that at the midpoint of its stroke the frequency generated will be 50,000 cycles per second. The extent of the modulation is determined by the lengths of the stroke of the shaft 84, which is determined in turn by the throw of the eccentric or cam 86. It is contemplated that a series of cams of different shapes may be provided in order to make it possible to vary the extent of the modulation. Thus a cam might be selected to give a 10,000 cycle modulation on either side of the base frequency. Under such conditions when the sleeve is at the top of its stroke, the frequency will be increased to, say, 60,000 cycles per second, and when the sleeve is at the bottom of its stroke the frequency will be decreased to 40,000 cycles per second. The base frequency about which the modulation is accomplished is thus determined by the initial positioning of the sleeve, and the proper setting will, in each case, be dependent upon the frequencies desired in the carrying out of a specified process of compression wave treatment.

It should be pointed out that by means of a simple modification of the device shown in the drawings, compression waves at relatively low frequencies may be produced. By removing the plug 72, the sleeve 80, and the cup 82 it is possible to screw onto the shaft 84 a conventional cylindrical piston. In this case the depth of the resonant chamber is enormously increased and the base frequency about which modulation is effected can be reduced to the audible range. To provide even lower frequencies the shaft 84 may be replaced by another considerably shorter shaft carrying a piston at its free end; in this case the length of the chamber is still further increased.

When the sleeve or piston has been adjusted to proper position for the frequencies desired, the compressed air or other gas is introduced through the conduit 60, and compression waves are then generated and modulated in the manner above described. A liquid, or liquids, to be treated is introduced through the conduits 52 and fed through the inlet 28 in the form of a cylindrical curtain which drops through the chamber 10 to the outlet 102. The thickness of the curtain is controlled by regulating the valve member 36. During its passage through the chamber 10 the curtain is subjected to the action of the compression waves leaving the whistle. The waves are reflected back and forth many times through the chamber and strike the curtain from a number of angles of attack and the modulation of the frequency over a wide range of frequencies is highly effective in improving the characteristics of many liquids. For example, oil and water may be emulsified most satisfactorily by first forming them into a laminated curtain in which one lamination is oil and the other lamination is water. When the curtain is subjected to bombardment by compression waves, a thorough and complete emulsification of the two liquids is obtained almost immediately. It is, of course, understood that for some processes it is unnecessary to vary or modulate the frequency of the compression waves. In such cases the motor 90 will not be energized, and the sleeve 80 will be set at a predetermined position and not moved during the treating process.

Those skilled in the art will appreciate the fact that the apparatus above described is based upon some of the principles involved in the well-known Galton whistle. They will also understand that by a few simple modifications it would be possible to produce similar results by adapting the principles of the Hartmann generator. The knife edge would be replaced by a tube having a flat top and a re-entrance portion just inside and below the upper edge; furthermore the distance between the nozzle and the tube would be somewhat greater than the distance between the nozzle 12 and the knife edge 14.

Having thus described and illustrated one preferred embodiment of my invention what I claim as new and desire to secure by Letters Patent of the United States is:

1. Acoustic device which comprises a nozzle having an annular outlet, a knife-edged tube aligned with said nozzle, a plug disposed in the end of said tube and spaced from the wall thereof, a movable sleeve disposed between the plug and said tube, and means for reciprocating said sleeve.

2. The structure defined in claim 1 wherein an exhaust pipe surrounds said knife-edged tube.

3. The structure defined in claim 1 wherein walls form a toroidal chamber surrounding and concentric with said nozzle and tube.

CAPERTON B. HORSLEY.

REFERENCES CITED

The following references are of record in the file of this patent:

UNITED STATES PATENTS

| Number | Name | Date |
|---|---|---|
| 716,568 | Moore | Dec. 23, 1902 |
| 766,027 | Fairchild | July 26, 1904 |
| 1,515,471 | Foley | Nov. 11, 1924 |
| 1,540,023 | Kollinek | June 2, 1925 |
| 1,890,212 | Bridgham | Dec. 6, 1932 |
| 2,163,649 | Weaver | June 27, 1939 |
| 2,170,178 | Williams | Aug. 22, 1939 |
| 2,238,668 | Wellenstein | Apr. 15, 1941 |
| 2,456,708 | Horsley | Dec. 21, 1948 |
| 2,519,619 | Yellott et al. | Aug. 22, 1950 |